US012508995B2

(12) United States Patent
Brick et al.

(10) Patent No.: US 12,508,995 B2
(45) Date of Patent: Dec. 30, 2025

(54) VEHICLE CARGO BED SYSTEMS INCLUDING A STAIR ASSEMBLY, A LOAD STOP, OR BOTH

(71) Applicant: Ford Global Technologies, LLC, Dearborn, MI (US)

(72) Inventors: William Charles Brick, Royal Oak, MI (US); Michael M. Azzouz, Farmington, MI (US); Scott Nydam, Farmington Hills, MI (US); Jay John Meyer, Howell, MI (US); Amol Borkar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 18/188,610

(22) Filed: Mar. 23, 2023

(65) Prior Publication Data

US 2023/0382306 A1 Nov. 30, 2023

Related U.S. Application Data

(60) Provisional application No. 63/411,797, filed on Sep. 30, 2022, provisional application No. 63/395,000, filed on Aug. 4, 2022, provisional application No. 63/345,495, filed on May 25, 2022.

(51) Int. Cl.
*B60R 3/02* (2006.01)
*B62D 33/027* (2006.01)

(52) U.S. Cl.
CPC ............ *B60R 3/02* (2013.01); *B62D 33/0273* (2013.01)

(58) Field of Classification Search
CPC ........ B60R 3/02; B62D 33/0273; B61D 23/02
See application file for complete search history.

(56) References Cited

U.S. PATENT DOCUMENTS

| 3,645,557 | A | * | 2/1972 | Aldropp | B60R 3/02 280/166 |
| 3,833,240 | A | * | 9/1974 | Weiler | B60R 3/02 280/166 |
| 4,527,941 | A | * | 7/1985 | Archer | B60R 3/02 296/61 |
| 5,584,493 | A | * | 12/1996 | Demski | B60R 3/02 105/445 |
| 6,270,139 | B1 | * | 8/2001 | Simpson | B60P 1/435 296/62 |
| 6,659,485 | B2 | * | 12/2003 | Ueno | B60R 3/02 182/98 |
| 6,685,204 | B1 | | 2/2004 | Hehr | |

(Continued)

FOREIGN PATENT DOCUMENTS

AU 2019204842 A1 * 1/2021
CN 205778491 U * 12/2016
(Continued)

*Primary Examiner* — Steve Clemmons
(74) *Attorney, Agent, or Firm* — Vichit Chea; Carlson, Gaskey & Olds, P.C.

(57) ABSTRACT

A cargo bed system includes a stair assembly that is movable between a stowed position and a staircase position relative to a vehicle structure. The stair assembly includes first and second support arm assemblies and first and a second steps. The first and second steps are configured to pivot together.

20 Claims, 16 Drawing Sheets

(56) References Cited

U.S. PATENT DOCUMENTS

| | | | |
|---|---|---|---|
| 6,905,158 B1* | 6/2005 | Bastian | B62D 33/0273 |
| | | | 296/62 |
| 7,232,173 B2* | 6/2007 | Katterloher | B62D 33/03 |
| | | | 296/57.1 |
| 7,516,997 B2 | 4/2009 | Kuznarik et al. | |
| 8,360,455 B2 | 1/2013 | Leitner et al. | |
| 9,168,190 B2* | 10/2015 | Rasekhi | B60R 3/02 |
| 10,246,137 B2 | 4/2019 | Ngo | |
| 10,464,618 B2 | 11/2019 | Loew et al. | |
| 10,994,660 B2 | 5/2021 | Ngo | |
| 11,110,971 B2 | 9/2021 | Singer | |
| 11,608,123 B2* | 3/2023 | Jarjoura | B62D 33/0273 |
| 11,673,507 B2* | 6/2023 | Robinson | B60R 3/02 |
| | | | 280/164.1 |
| 2005/0146112 A1 | 7/2005 | Bang et al. | |
| 2008/0231067 A1* | 9/2008 | Nagle | B60P 3/122 |
| | | | 296/50 |
| 2020/0102788 A1* | 4/2020 | Byers | E06C 7/505 |
| 2021/0163082 A1* | 6/2021 | Borkar | B60R 3/02 |
| 2021/0261060 A1 | 8/2021 | Schwarz | |
| 2022/0227209 A1 | 7/2022 | Nania | |
| 2022/0355737 A1 | 11/2022 | Nania | |

FOREIGN PATENT DOCUMENTS

| | | | | |
|---|---|---|---|---|
| CN | 112498245 A | * | 3/2021 | B60R 3/02 |
| GB | 2551967 A | * | 1/2018 | B60P 3/14 |
| WO | WO-2024050633 A1 | * | 3/2024 | E06C 7/082 |

* cited by examiner

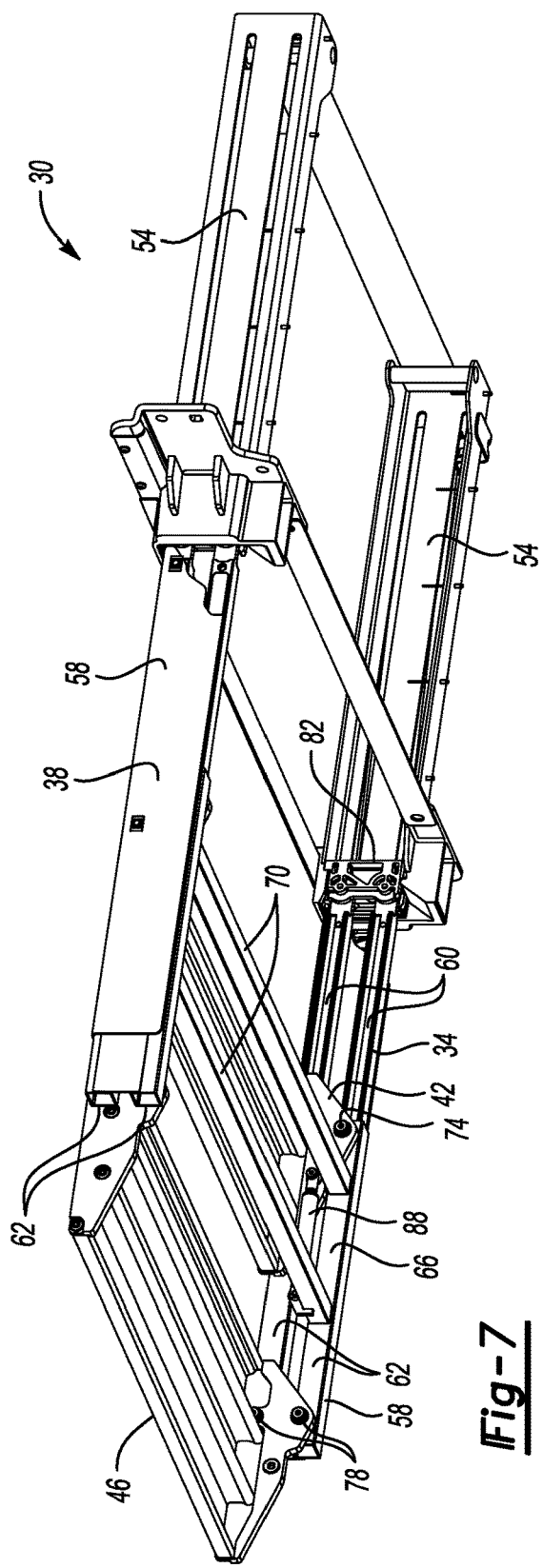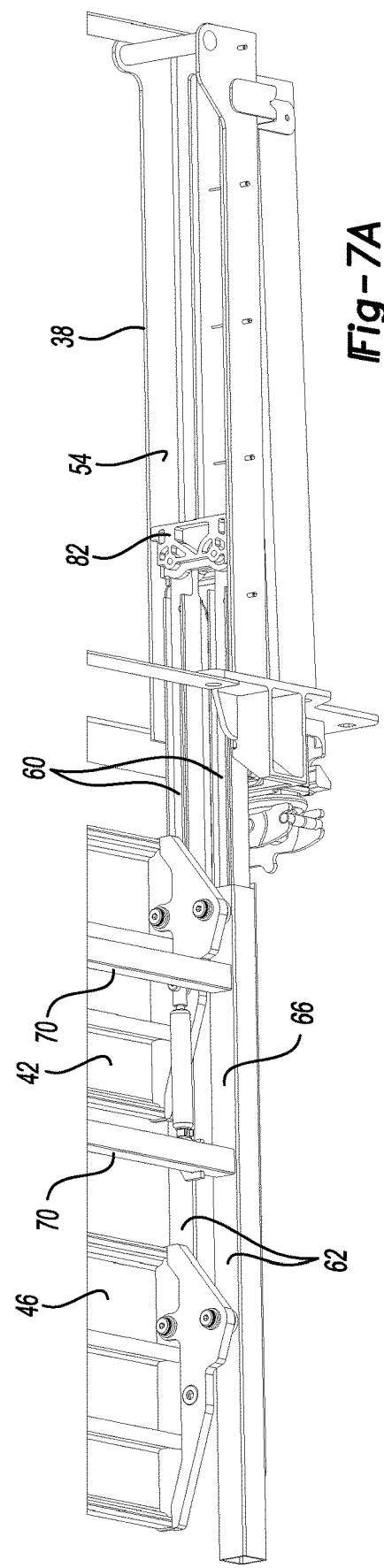

VEHICLE CARGO BED SYSTEMS INCLUDING A STAIR ASSEMBLY, A LOAD STOP, OR BOTH

CROSS-REFERENCE TO RELATED APPLICATIONS

This application claims priority to U.S. Provisional Application Nos. 63/345,495 filed on 25 May 2022, 63/395,000 filed on 4 Aug. 2022, and 63/411,797 filed on 30 Sep. 2022. These provisional applications are incorporated herein by reference in their entirety.

TECHNICAL FIELD

This disclosure relates generally to a cargo bed of a vehicle, and more particularly, to a stair assembly that can be used to access the cargo bed.

BACKGROUND

Some vehicles, pickup trucks, include a cargo bed. Users can utilize cargo beds to carry various types of cargo. The cargo bed can be located behind a passenger compartment of a vehicle. A tailgate can enclose an aft end of the cargo bed. Some cargo beds can transition back-and-forth between a standard bed position and an extended bed position.

SUMMARY

In some aspects, the techniques described herein relate to a cargo bed system, including a stair assembly movable between a stowed position and a staircase position relative to a vehicle structure; first and second support arm assemblies of the stair assembly; and first and a second steps of the stair assembly, the first and second steps configured to pivot together.

In some aspects, the techniques described herein relate to a system, wherein the stair assembly is stowed within the vehicle structure when in the stowed position, wherein the stair assembly is extended from the vehicle structure and pivoted downward from the vehicle structure when in the staircase position.

In some aspects, the techniques described herein relate to a system, wherein, when moved from the stowed position to the staircase position, the stair assembly is configured to translate horizontally from the stowed position to an extended position where the stair assembly is extended relative to the vehicle structure, and then pivot relative to the vehicle structure from the extended position to the staircase position.

In some aspects, the techniques described herein relate to a system, wherein the first step and the second steps pivot together relative to the first and second support arm assemblies when the stair assembly pivots relative to the vehicle structure from the extended position to the staircase position.

In some aspects, the techniques described herein relate to a system, wherein the first and second steps are pivotably coupled together.

In some aspects, the techniques described herein relate to a system, wherein the first and second support arm assemblies each include two bars of a four-bar linkage that pivotably couples together the first and second steps.

In some aspects, the techniques described herein relate to a system, wherein the four-bar linkage telescopes relative to respective fixed rails of the support arm assemblies when the stair assembly is transition from the stowed position to an extended position, wherein the four-bar linkage pivots relative to the respective fixed rails when the stair assembly is pivoted from the extended position to the staircase position.

In some aspects, the techniques described herein relate to a system, wherein the support arm assemblies each include a fixed rail that slidably receives a plurality of bars of a four-bar linkage assembly.

In some aspects, the techniques described herein relate to a system, wherein the vehicle structure is a tailgate of a vehicle.

In some aspects, the techniques described herein relate to a system, wherein the stair assembly extends rearward relative to an orientation of the vehicle when moving from the stowed position within the tailgate.

In some aspects, the techniques described herein relate to a system, wherein the stair assembly moves laterally outward relative to an orientation of the vehicle when moving from the stowed position within the tailgate.

In some aspects, the techniques described herein relate to a system, wherein the first and second steps each include a stepping surface, the first and second steps pivoting to keep the respective stepping surfaces facing vertically upward when the stair assembly is transitioned between the stowed position and the stepping position.

In some aspects, the techniques described herein relate to a system, wherein the first step is spaced vertically from the second step when the stepping assembly is in the staircase position.

In some aspects, the techniques described herein relate to a system, further including at least one lift assist that damps movement of the stair assembly from the staircase position to the extended position, assists movement of the stair assembly from the staircase position to an extended position, or both.

In some aspects, the techniques described herein relate to a method of transitioning a stair assembly of a vehicle, including: extending a stair assembly from a stowed position within a vehicle structure to an extended position relative to the vehicle structure; lowering the stair assembly from the extended position to a staircase position by pivoting rail assemblies of the stair assembly relative to the vehicle structure; and during the lowering, rotating the rail assemblies relative to at least one step of the stair assembly.

In some aspects, the techniques described herein relate to a method, wherein the at least one step includes an upper step and a lower step.

In some aspects, the techniques described herein relate to a method, wherein the upper step and the lower step are rotatably coupled together.

In some aspects, the techniques described herein relate to a method, wherein the vehicle structure is a vehicle tailgate.

BRIEF DESCRIPTION OF THE FIGURES

FIG. 7 illustrates a bottom, perspective view of the stair assembly in the extended position of FIG. 2.

FIG. 7A illustrates a bottom, perspective view of a portion of the stair assembly in a partially extended position.

DETAILED DESCRIPTION

Figure 1:
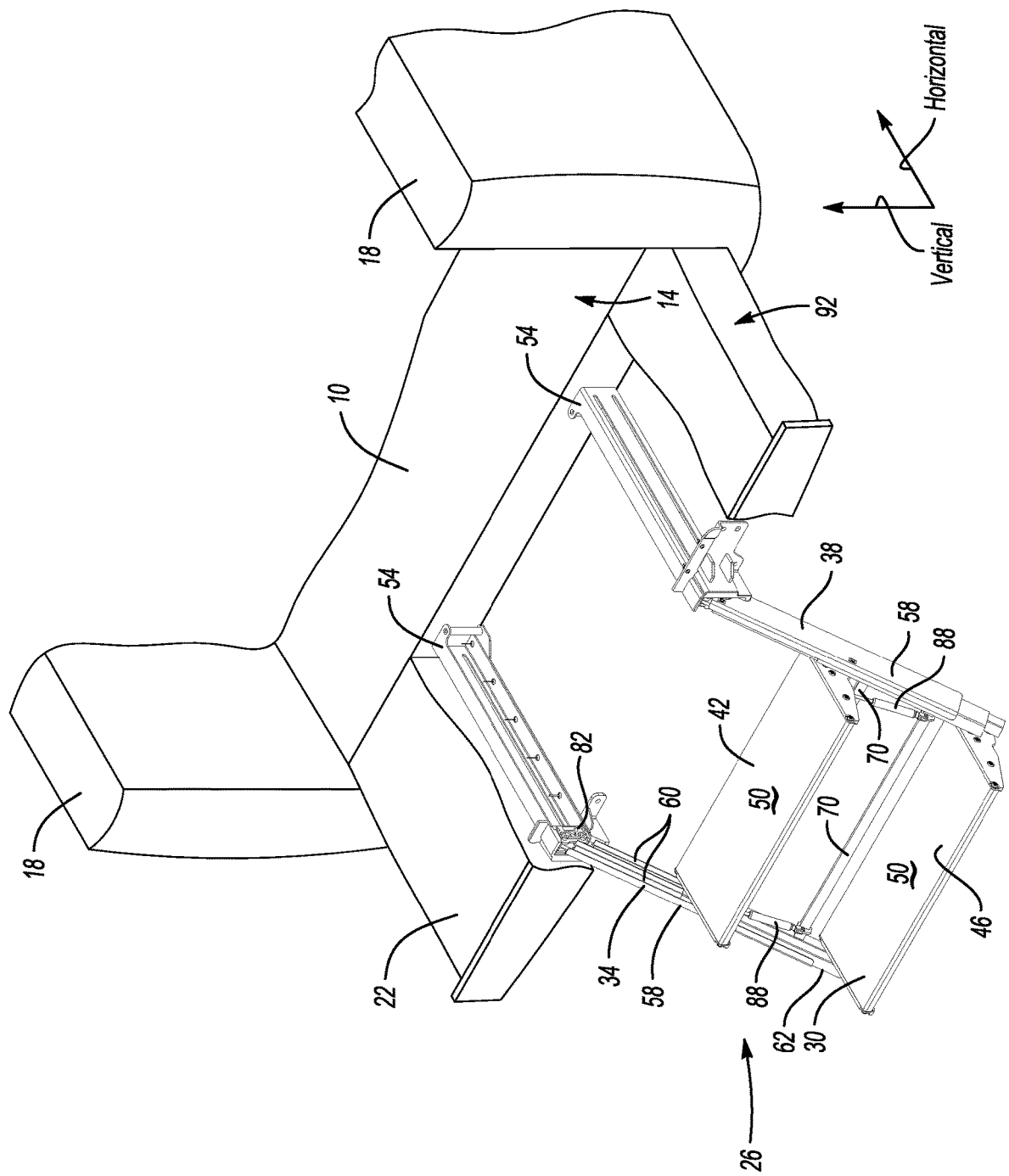
FIG. 1 illustrates a stair assembly to a cargo bed of a vehicle with the stair assembly in a staircase position.

A vehicle, such as pickup truck, can include a cargo bed. Some cargo beds are extendable. This disclosure is directed toward systems that can be used in connection with the cargo bed. Some of the disclosed systems are cargo bed access systems that include step assemblies used to assist a user entering and exiting the cargo bed. Some of the disclosed systems instead or additionally include load stops that can help to hold cargo in the cargo bed.

With reference to FIGS. 1-4, in an exemplary embodiment of the present disclosure, a vehicle 10, here a pickup truck, includes a cargo bed 14 between opposing side walls 18. A tailgate 22 of the vehicle 10 can pivot back-and-forth from a closed position (not shown) to an open position. When the tailgate 22 is in the closed position, the tailgate 22 encloses an aft end of the cargo bed 14.

The vehicle 10 includes a cargo bed access system 26, which, in this example, includes a stair assembly 30. The stair assembly 30 is coupled to a vehicle structure—here the tailgate 22.

The stair assembly 30 is movable back-and-forth between a stowed position and a staircase position relative to the vehicle structure. When the stair assembly 30 is in the staircase position of FIG. 1, a user can use the stair assembly 30 to enter or exit the cargo bed 14. The stair assembly 30, when in the stowed position, is stowed within the tailgate 22 as shown in FIG. 2.

When access to the cargo bed 14 is not required, the tailgate 22 can be in the closed position and the stair assembly 30 in the stowed position. When accessing the cargo bed 14 is desired, the tailgate 22 is pivoted to the open position of FIG. 2. With the tailgate 22 in the open position, the stair assembly 30 is transitioned from the stowed position to an extended position shown in FIG. 3. After reaching the extended position, the stair assembly 30 can be pivoted vertically downward as shown in FIG. 4 until reaching the staircase position of FIG. 1. Vertical and horizontal, for purposes of this disclosure, are with reference to ground and a general orientation of the vehicle 10 during ordinary operation.

Figure 2:
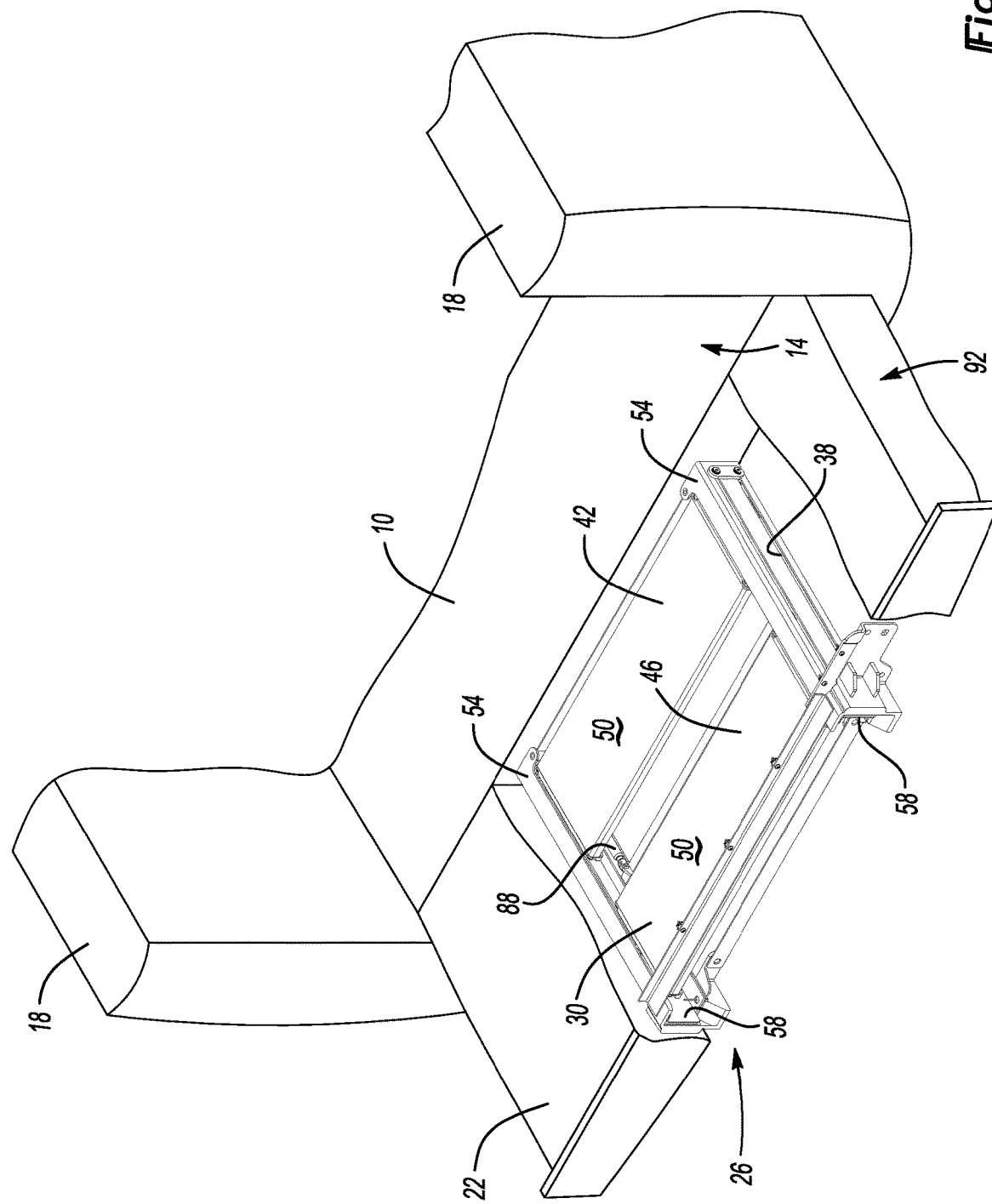
FIG. 2 illustrates a perspective view of the stair assembly of FIG. 1 in a stowed position within a tailgate of the vehicle.
Figure 3:
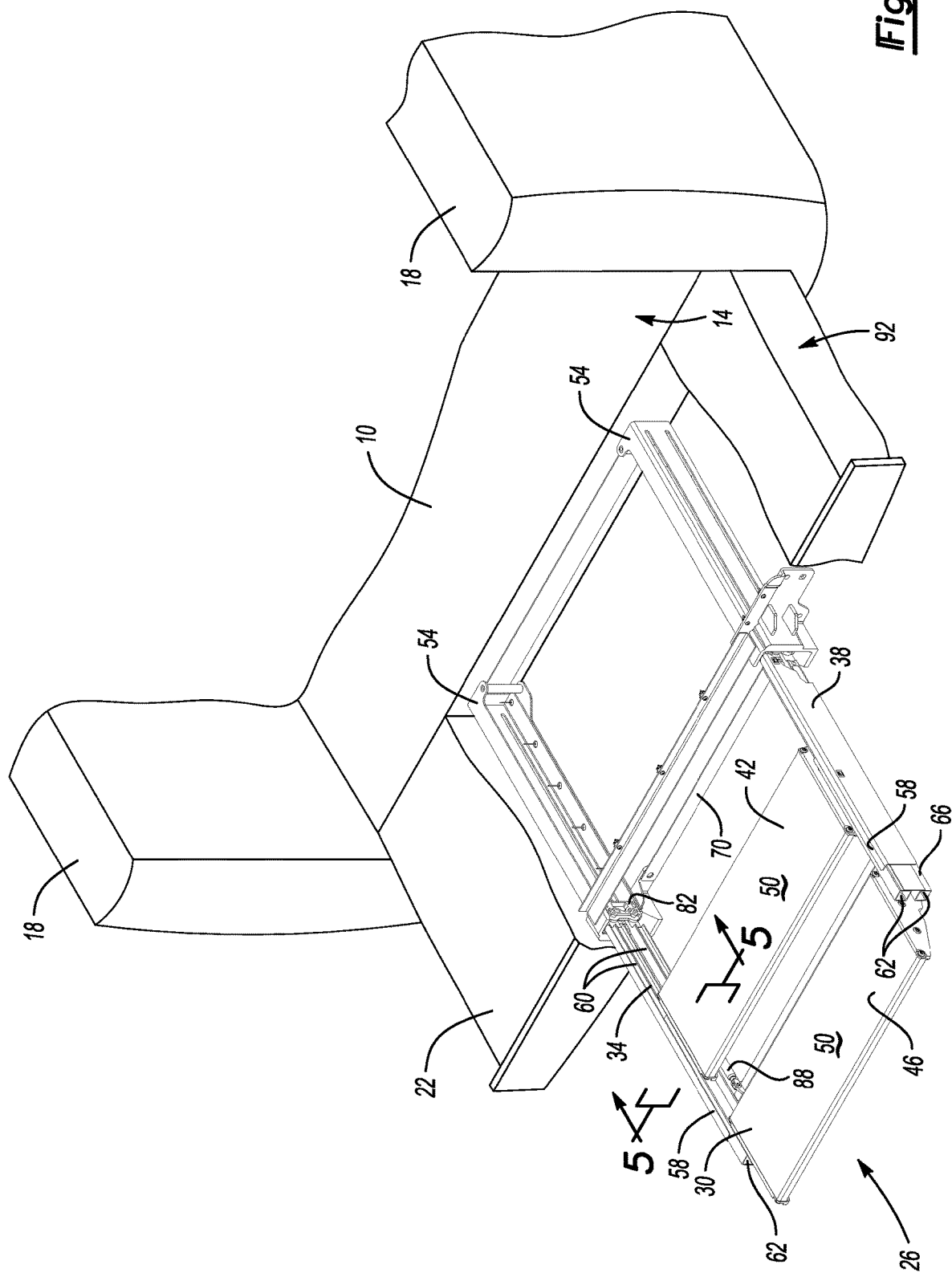
FIG. 3 illustrates the stair assembly of FIG. 1 in an extended position.
Figure 4:
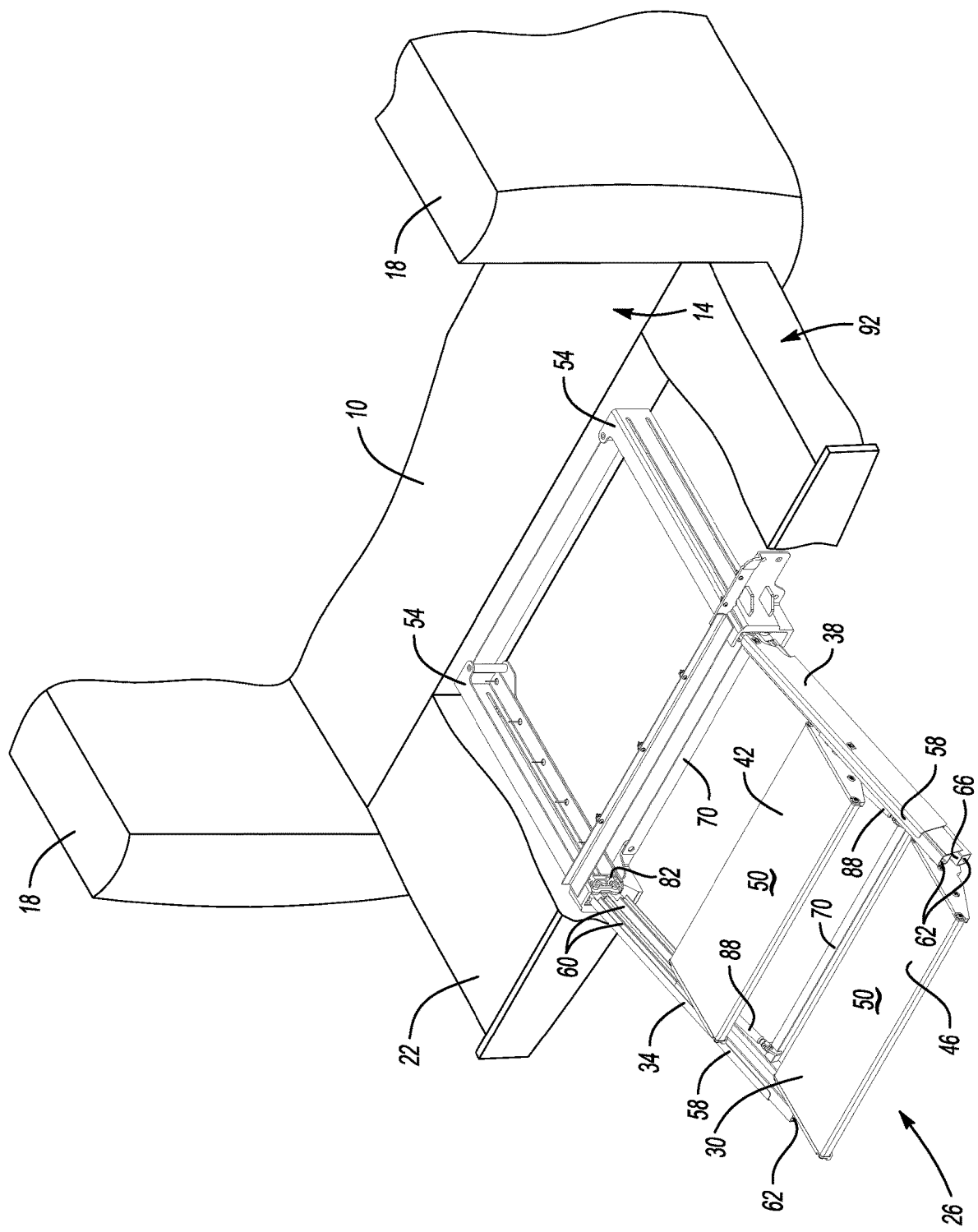
FIG. 4 illustrates the stair assembly of FIG. 1 between the extended position of FIG. 3 and the staircase position of FIG. 1.

When access is no longer required, the stair assembly 30 is pivoted upward from the staircase position to the extended position of FIG. 3 and then slid back within the tailgate 22 until reaching the stowed position of FIG. 2. The tailgate 22 can then be pivoted from the open position to the closed position to enclose the aft end of the cargo bed 14.

Figure 5:
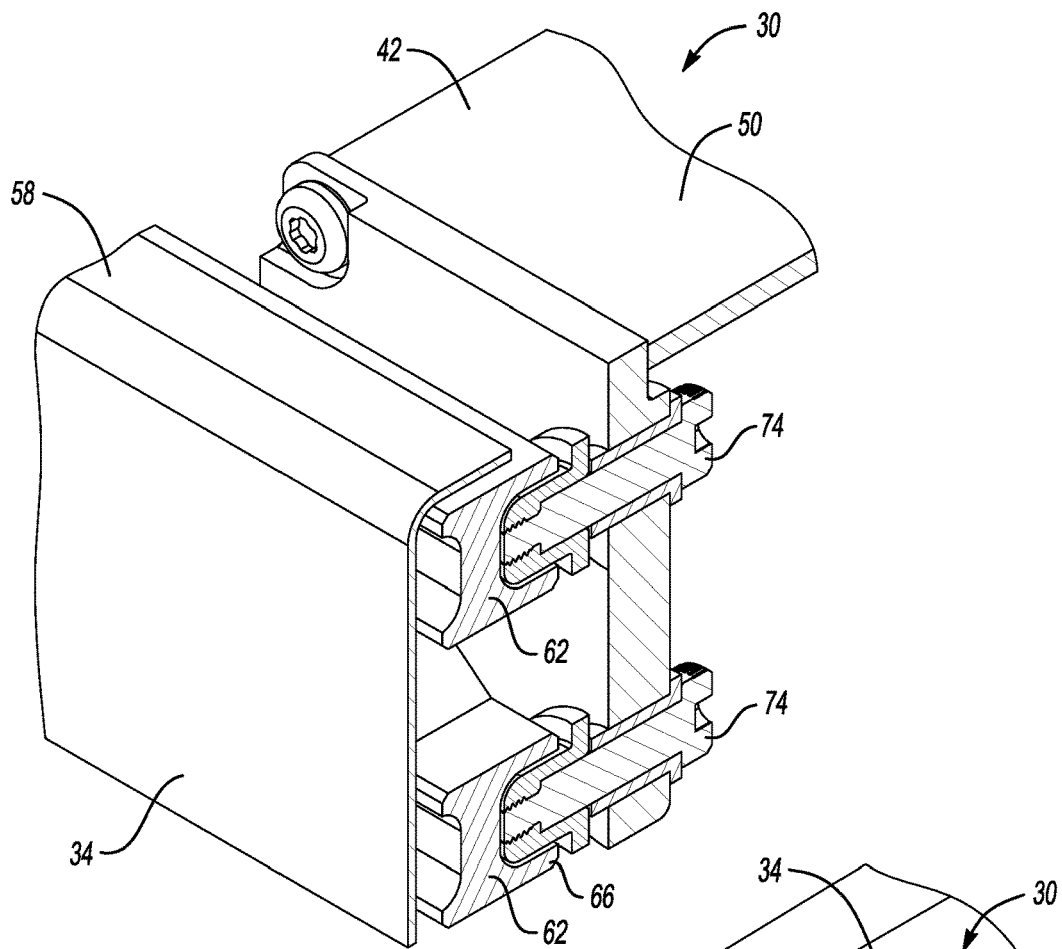
FIG. 5 illustrates a section view taken at line 5-5 in FIG. 3.
Figure 6:
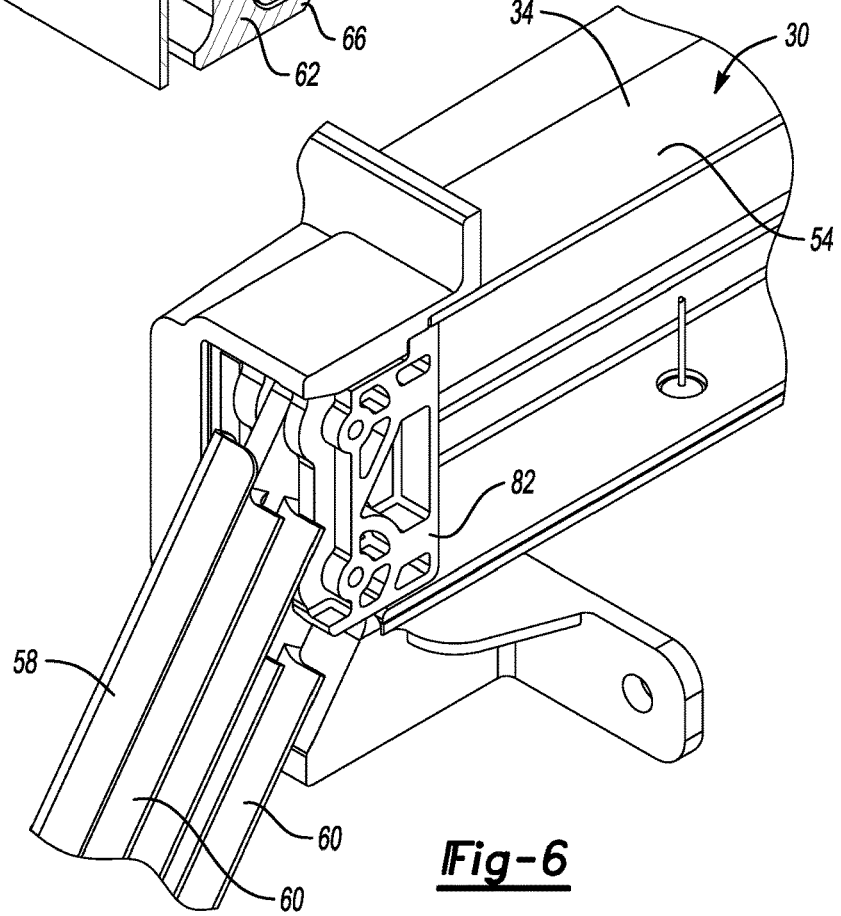
FIG. 6 illustrates a closeup view of an area of FIG. 4.

With reference now to FIGS. 5-7 and continued reference to FIGS. 1-4, the stair assembly 30 includes a first support arm assembly 34, a second support arm assembly 38, a first step 42, and a second step 46. The first support arm assembly 34 and the second support arm assembly 38 are spaced apart and oriented parallel to each other. The first step 42 and the second step 46 each span from the first support arm assembly 34 to the second support arm assembly 38.

The first step 42 and the second step 46 each include a step surface 50. As the stair assembly 30 transitions from the extended position of FIG. 3 to the staircase position of FIG. 1, the first step 42 and the second step 46 pivot together relative to the support arm assemblies 34 and 38. In this example, pivoting the first step 42 and the second step 46 together maintains the respective step surfaces 50 facing vertically upward.

The first support arm assembly 34 and the second support arm assembly 38, in this example, each include a fixed rail 54, a movable shield 58, two inner bars 60, and two outer bars 62. The inner bars 60 are telescopically received within respective outer bars 62. The two outer bars 62 of the first support arm assembly 34 and the two outer bars 62 of the second support arm assembly 38 provide a four-bar linkage 66. The outer bars 62 can extend and retract relative to the inner bars 60 of the first support arm assembly 34 and the second support arm assembly 38. Braces span between the two outer bars 62 of the first support arm assembly 34 and the two outer bars 62 of the second support arm assembly 38.

The outer bars 62 of the first support arm assembly 34 are received within the movable shield 58 when the stair assembly 30 is in the stowed position of FIG. 2. The movable shield 58, inner bars 60, and outer bars 62 are slidably received within the fixed rail 54 when the stair assembly 30 is in the stowed position of FIG. 2.

The outer bars 62 of the first support arm assembly 34 telescopically extend relative to the inner bars 60 and the movable shield 58 of the first support arm assembly 34 as the stair assembly 30 transitions from the stowed position to the extended position of FIG. 3. The outer bars 62, the inner bars 60, and the movable shield 58 of the first support arm assembly 34 telescopically extend relative to the fixed rail 54 of the first support arm assembly 34 when the stair assembly 30 transitions from the stowed position to the extended position of FIG. 3.

The second support arm assembly 38 telescopically extends similarly to the first support arm assembly 34 with the outer bars 62 of the second support arm assembly 34 telescopically extending from the movable shield 58 and the inner bars 60.

The first step 42 is an upper step in this example. One side of the first step 42 is pivotably coupled to the two outer bars 62 of the first support arm assembly 34 at upper step pivot points 74. The other side of the first step 42 is pivotably coupled to the two outer bars 62 of the second support arm assembly 38 at other upper step pivot points 74.

The second step 46 is a lower step in this example. One side of the second step 46 is pivotably coupled to the two outer bars 62 of the first support arm assembly 34 at lower step pivot points 78. The other side of the second step 46 is pivotably coupled to the two outer bars 62 of the second support arm assembly 38 at other lower step pivot points 78.

Coupling the first step 42 and the second step 46 together using the four-bar linkage 66 causes the first step 42 and the second step 46 to pivot together relative to the first support are assembly 34 and the second support arm assembly 38 when the stair assembly 30 transitions from the extended position of FIG. 3 to the staircase position of FIG. 1.

The inner bars 60 of the first support arm assembly 34 and the inner bars 60 of the second support arm assembly 38 are each pivotably coupled to a respective slider bracket 82. The slider brackets 82 slide with the inner bars 60 within the fixed rails 54 when the stair assembly 30 transitions from the stowed position to the extended position. The slider brackets 82 are not withdrawn from the fixed rails 54 and remain within the fixed rails 54 as the stair assembly 30 is transitioned from the extended position to the staircase position. The slider brackets 82 can prevent the outer bars 62, inner bars 60, and the movable shields 58 from disengaging from the respective fixed rails 54. The movable shield 58 can block a user's fingers from moving in between the outer bars 62 or in between the inner bars 60 as the stair assembly 30 is lowered to the staircase position.

The movable shields 58, inner bars 60, and outer bars 62 are blocked from pivoting relative to the respective slider brackets 82 until the slider brackets 82 have reached aft ends of the respective fixed rails 54. Contact between the inner bars 60 and the fixed rails 54, or between the outer bars 62 and the fixed rails 54 can block such downward pivoting. As shown in FIGS. 6 and 7, when stair assembly 30 is in the extended position, the movable shields 58, inner bars 60, and the outer bars 62 are free to pivot downward relative to the slider brackets 82 without the movable shields 58, inner bars 60, or outer bars 62 contacting the fixed rails 54.

In some examples, the stair assembly 30 can be locked in the extended position. A locking assembly, for example, could be used to lock the stair assembly 30. When locked in the extended position, the stair assembly 30 can, in some examples, support a load and effectively extend a length of the cargo bed 14.

In some examples, the stair assembly 30 can be moved and locked in a position that is in between the stowed position of FIG. 2 and the extended position of FIG. 3. This position, shown in FIG. 7A, and be considered a partially extended position. When in the partially extended position, the slider brackets 82, portions of the inner bars 60, and portions of the outer bars 62 are retracted within the tailgate 22. This acts as a lever overlapped with the fixed rails 54 to support the stair assembly 30 cantilevered in the partially extended position. The stair assembly 30, when partially extended, is blocked from rotating downward to the staircase position. In this example, contact between the inner bars 60 and the fixed rails 54, or contact between the outer bars 66 and the fixed rails 54, blocks such rotation. The stair assembly 30 can be locked in the partially extended position in some examples. The lock is then released to permit the stair assembly 30 to move to the extend position of FIG. 3.

The lock can be plunger lock having a release handle beneath one of the steps 50. A plunger of the plunger lock could secure one of the slider brackets 82 relative to one of the fixed rails 54. A plunger lock could also be used to restrict movement (e.g., play) of the steps 50 when the stair assembly 30 is in the staircase position of FIG. 1. A release handle for this plunger lock could also be positioned beneath one of the steps 50.

In this example, the stair assembly 30 includes at least one lift assist 88. The movement of the stair assembly 30 from the extended position of FIG. 2 to the staircase position of FIG. 4 is damped by the at least one lift assist 88. That is, the at least one lift assist 88 slows the speed at which the stair assembly 30 transitions from the extended position of FIG. 3 to the staircase position of FIG. 1. The lift assist 88 can also assists the user lifting the stair assembly 30 from the staircase position to the extended position.

The stair assembly 30 can, in some examples, be used in connection with a handle that can be stowed within the tailgate 22 alongside the stair assembly 30 in the stowed position. The user can grasp the handle when using the stair assembly 30 to entering and exit the cargo bed 14.

In this example, the stair assembly 30 translates horizontally rearward from the tailgate 22 when transitioning from the stowed position to the extended position. While the example stair assembly 30 is shown as extending rearward from the stowed position, the stair assembly 30 could extend from a vehicle structure in another direction. For example, the stair assembly 30 could extend and retract from a laterally outboard side 92 of the tailgate 22. In such an example, the stair assembly 30 moves laterally outward relative to an orientation of the vehicle 10 when moving from the stowed position within the laterally outboard side 92 of the tailgate 22.

Figure 8A:
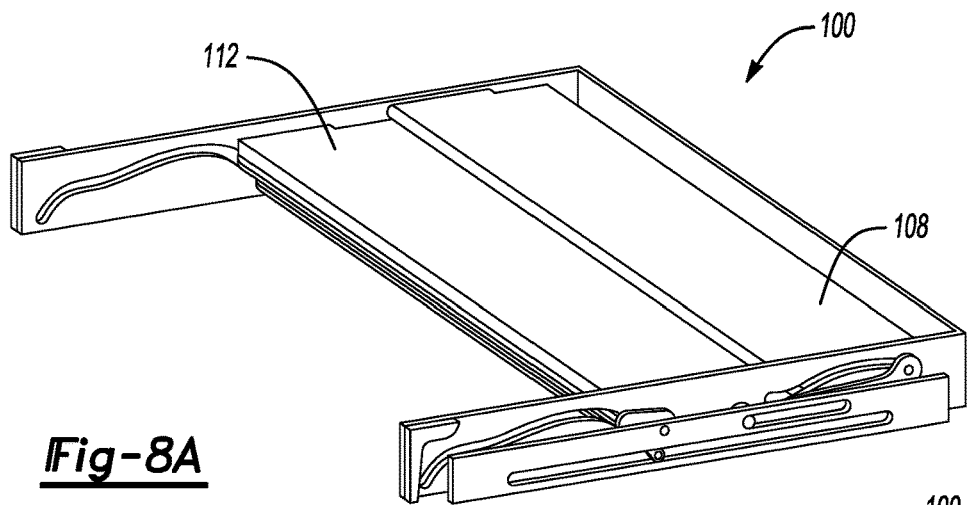
FIGS. 8A to 8C illustrate perspective views of a stair assembly according to another exemplary embodiment of the present disclosure.
Figure 8B:
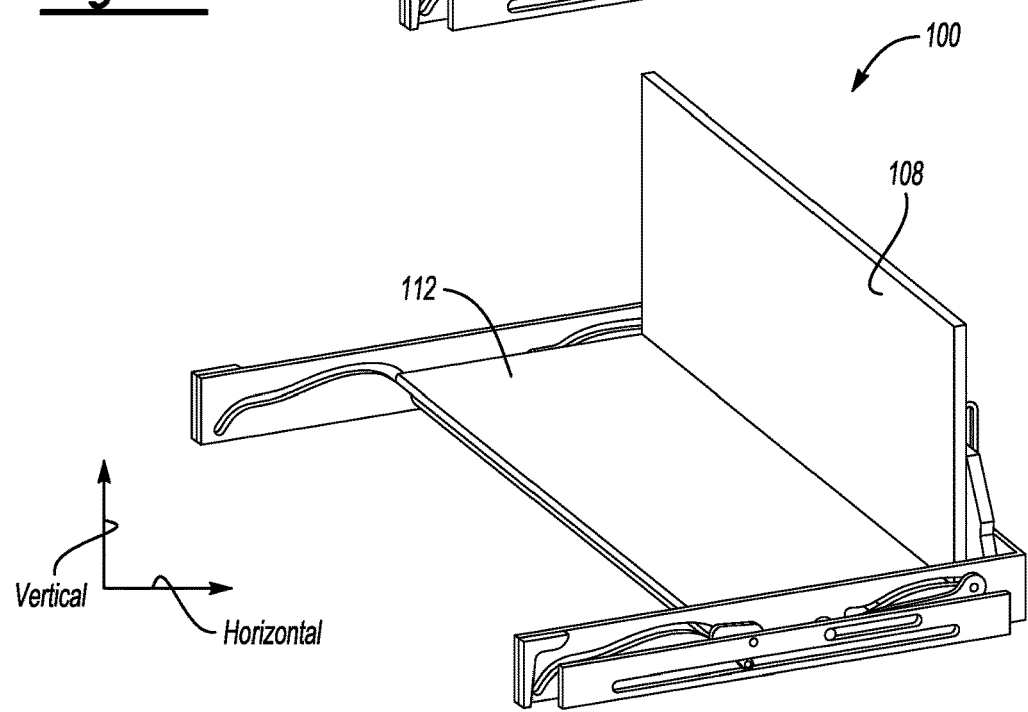
Figure 8C:
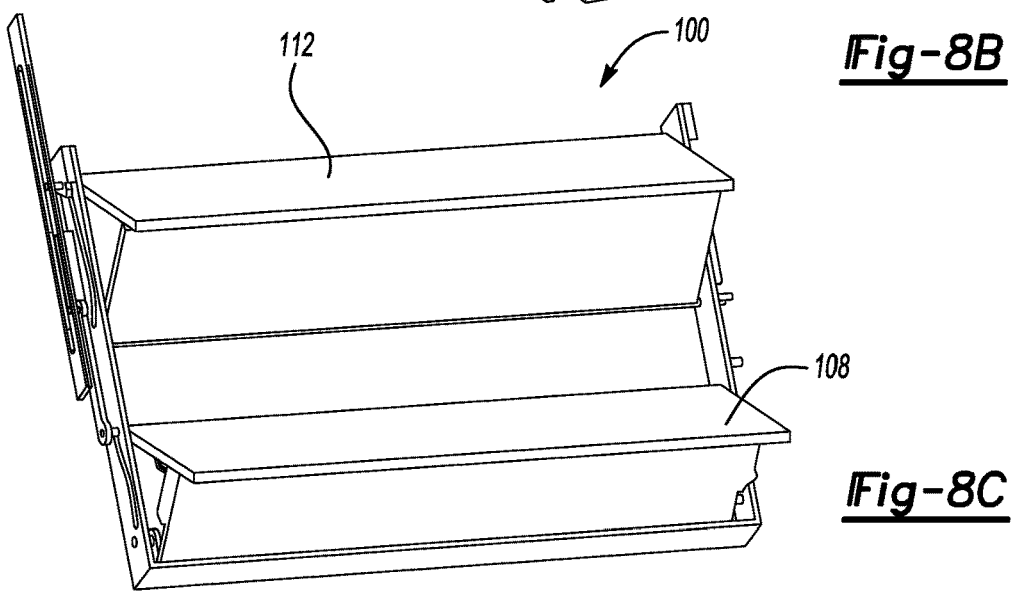

With reference now to FIGS. 8A-8C, a stair assembly 100 according to another exemplary embodiment of the present can extend and retract relative to a structure, such as a tailgate. The steps of the example stair assembly 100 are not configured to pivot together. As shown in FIG. 8B, a step 108 of the stair assembly 100 can be pivoted upward while the other step 112 of the stair assembly 100 is not pivoted upward.

The step 108 that is pivoted upward can provide a load stop when the stair assembly 100 is in a partially extended or a fully extended position relative to the tailgate. Cargo, such as a sheet of material, can be stowed within the cargo bed area. The step 108 providing the load stop can help to block movement of material from the cargo bed area. The stair assembly 100 can, in some examples, include a locking system that can lock the stair assembly 100 in a partially extended or fully extended position. This can permit positioning, and locking, of the step 108 providing the load stop at a plurality of horizontal positions, which can help to adjust the load stop to a particular load.

Figure 9A:
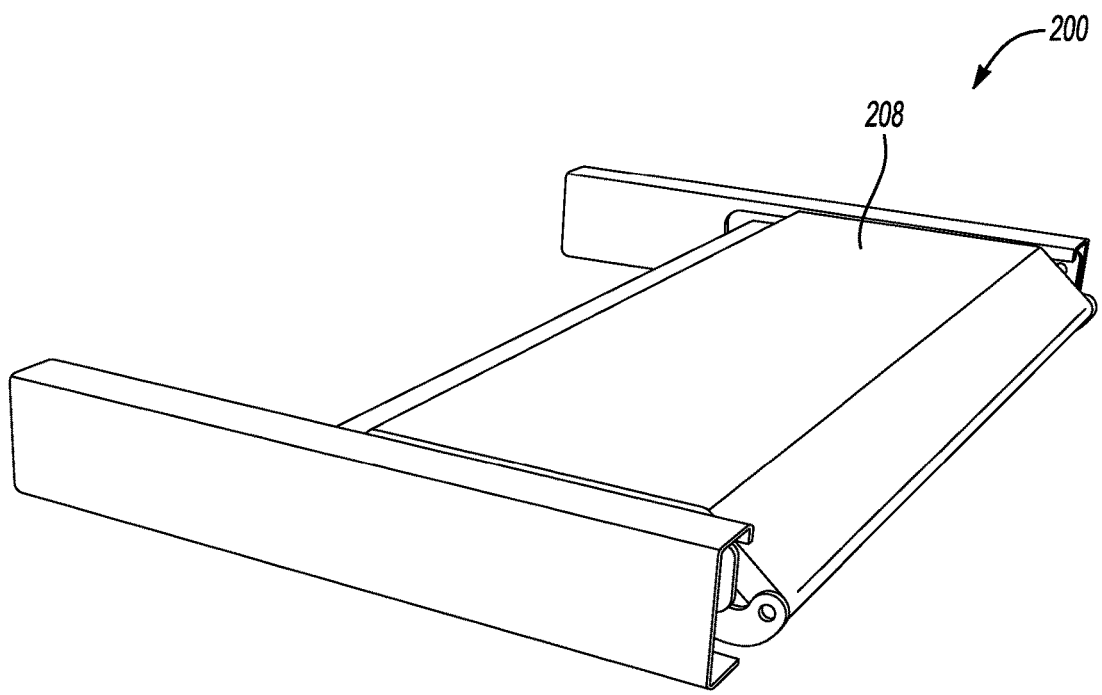
FIGS. 9A and 9B illustrate perspective views of a stair assembly according to yet another exemplary embodiment of the present disclosure.
Figure 9B:
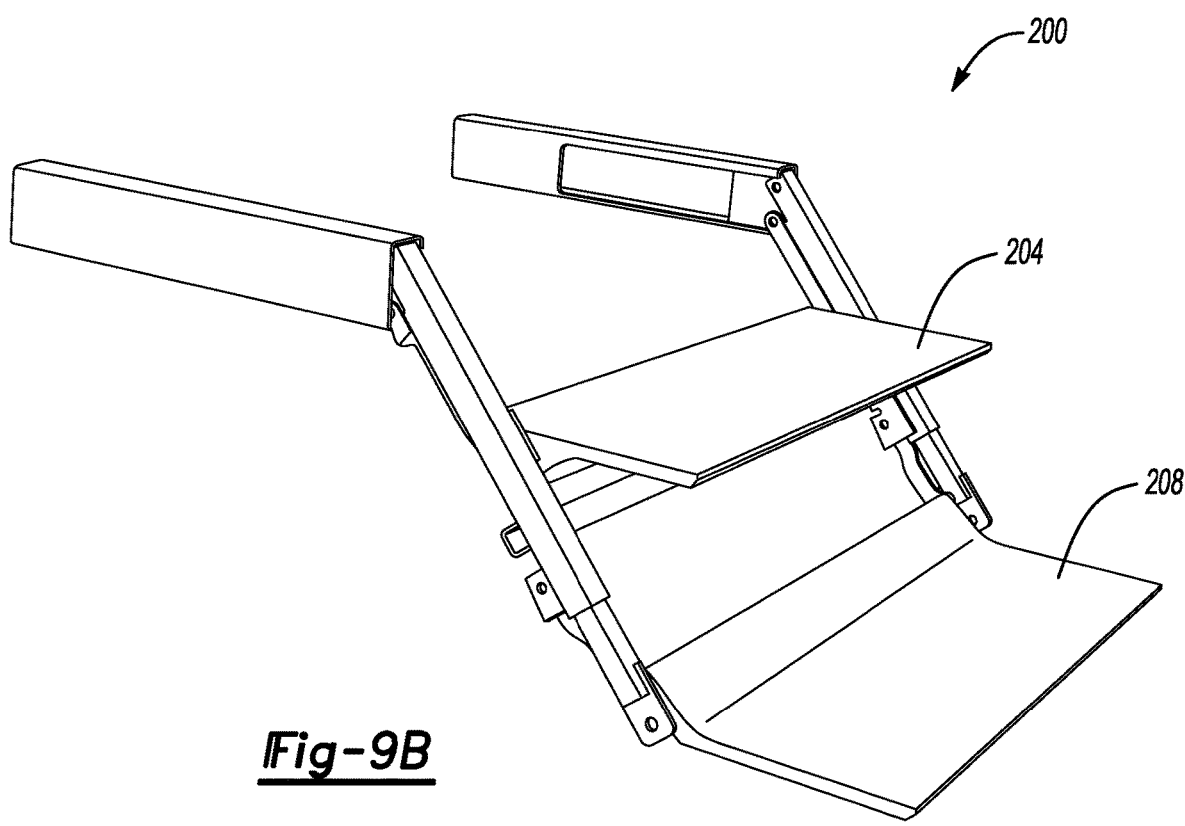

With reference now to FIGS. 9A and 9B, a stair assembly 200 according to yet another exemplary embodiment includes two independently pivotable steps 204 and 208. A user can utilize the stair assembly 200 to access a cargo bed of a vehicle when the stair assembly 200 is in the staircase position of FIG. 9B.

With reference now to FIGS. 10A-10D, an example vehicle 300 can include a cargo bed 304 that is extendible. The cargo bed 304 is movable between a standard position and an extended position. FIGS. 10A-10D show the cargo bed 304 in the extended position. The example step assemblies of FIGS. 1-9B can be used with a cargo bed that is extendable or a cargo bed that is not extendable.

A tailgate 308 of the vehicle 300 includes a flip-up work surface system 312. The flip-up work surface system 312 includes, in this example, a central section 316, a passenger side section 320, and a driver side section 324, which are each pivotably coupled to the tailgate 308.

Figure 10A:
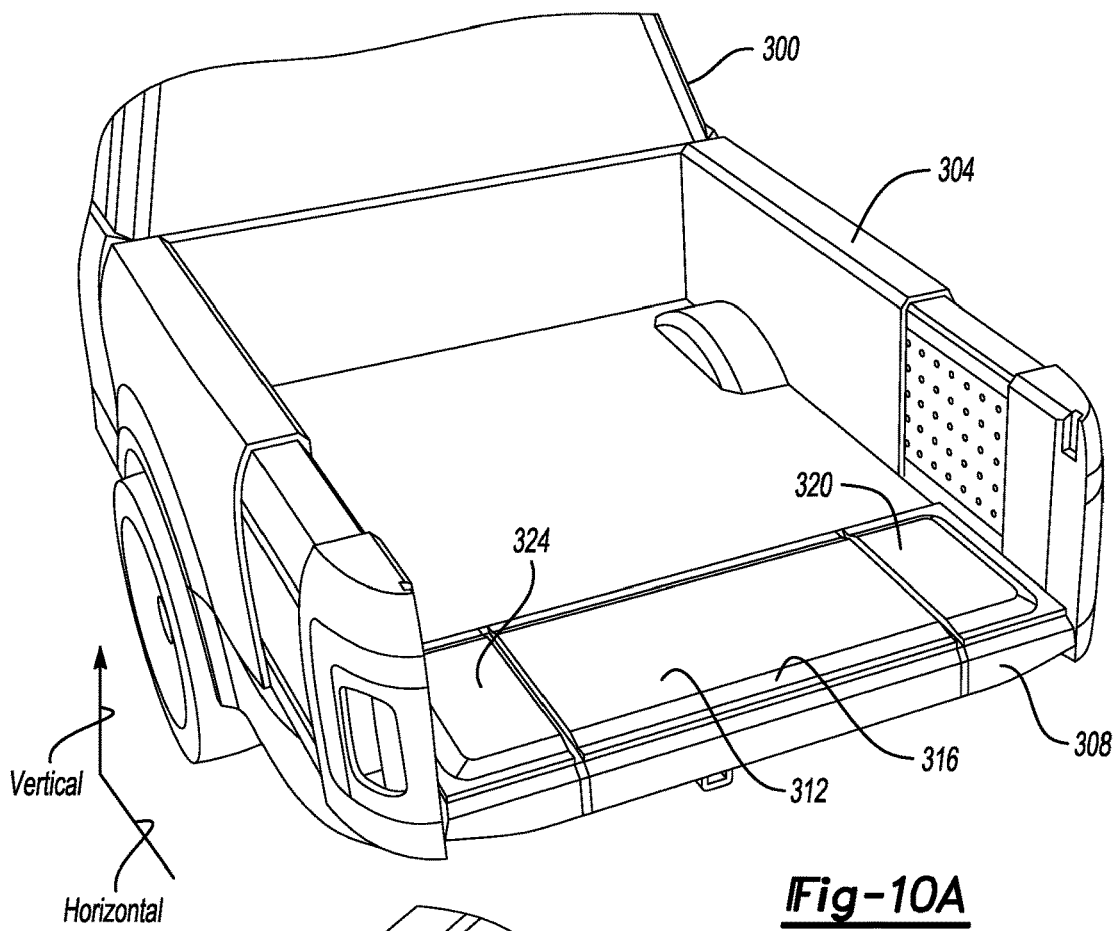
FIGS. 10A to 10D illustrate selected portions of a vehicle showing a flip-up work surface.
Figure 10B:
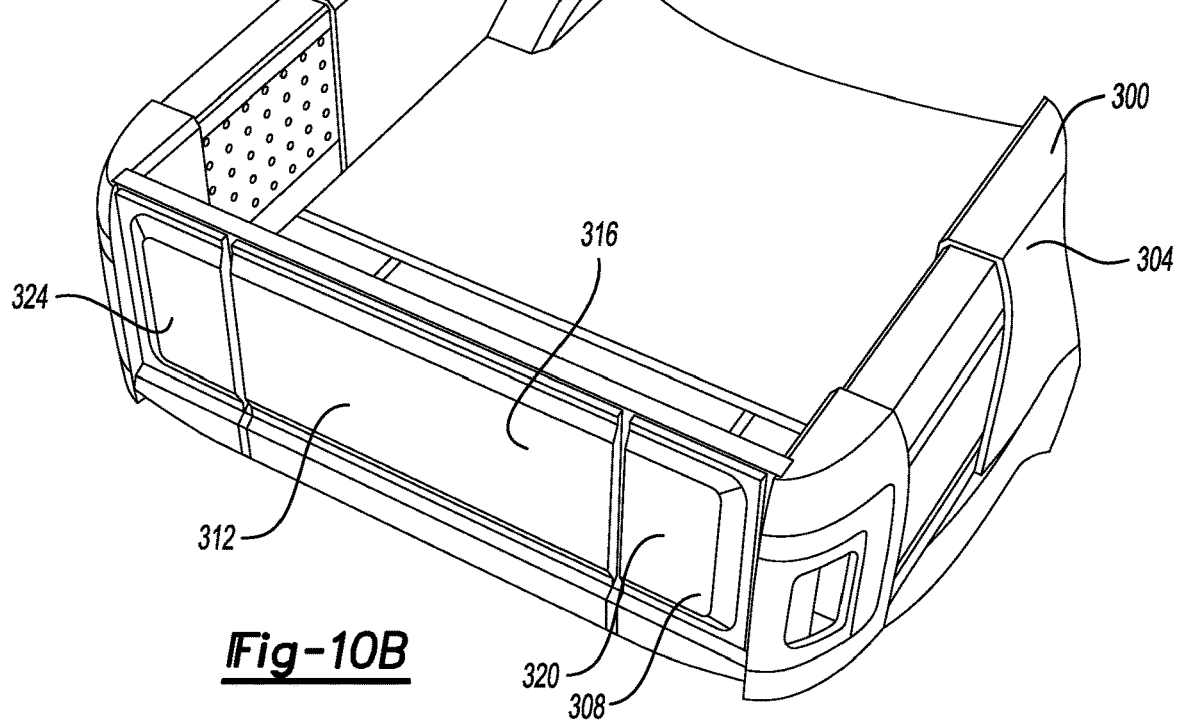

With the tailgate 308 open as shown in FIGS. 10A-10B, the sections can be pivoted from a horizontal position shown in FIG. 10A to a vertical position shown in FIG. 10B. The central section 316, the passenger side section 320, and the driver side section 324, can each be locked in the vertical position to provide a load stop.

Figure 10C:
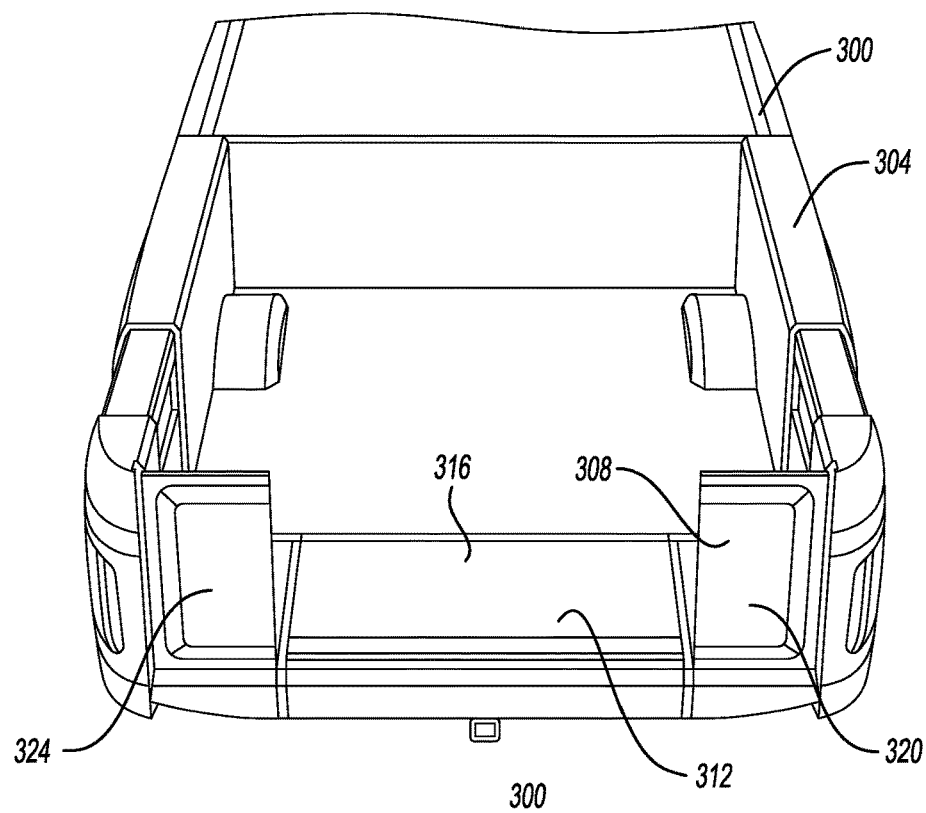

The central section 316, the passenger side section 320, and the driver side section 324, are independently pivotable. For example, as shown in FIG. 10C, the central section 316 can remain in the horizontal position while the passenger side section 320 and the driver side section 324 are pivoted to the vertical position. This positioning may be useful to provide access to areas of a cargo bed 304 of the vehicle 300.

Figure 10D:
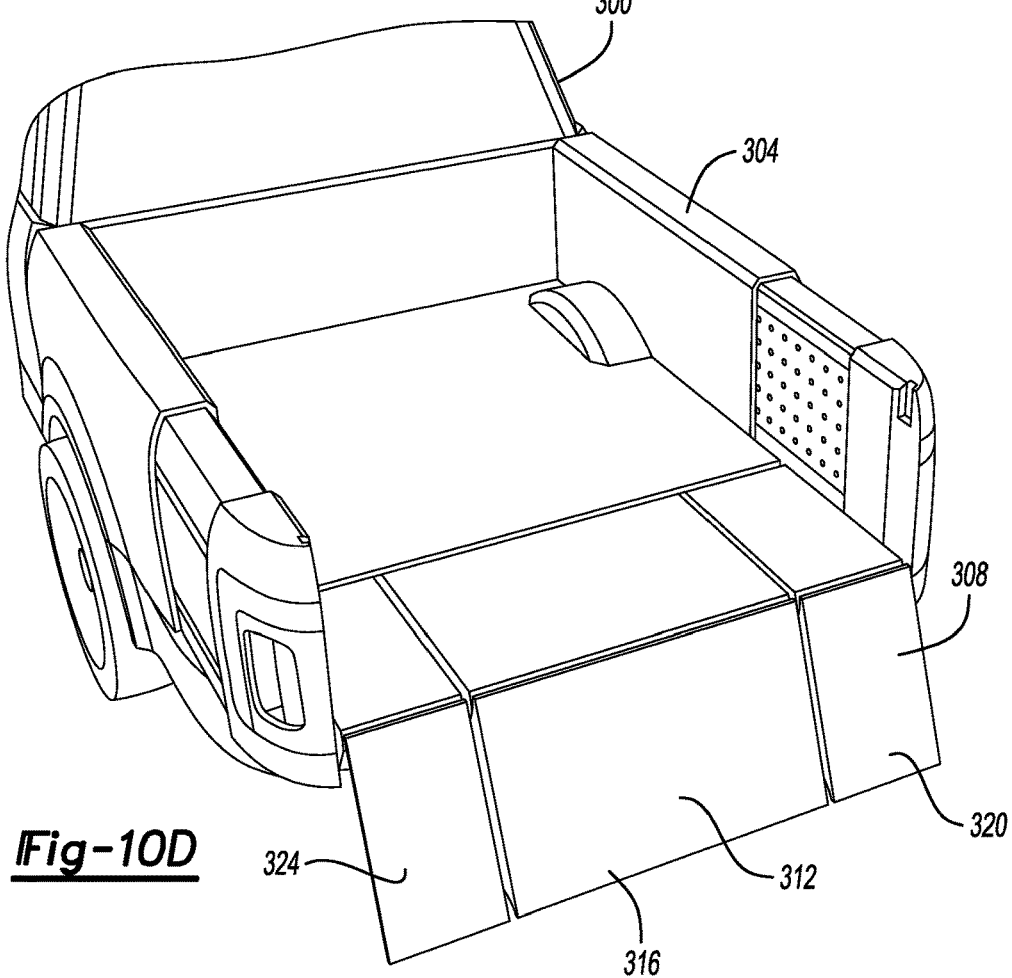

In this example, the central section 316, the passenger side section 320, and the driver side section 324, can each pivot past the vertical position to a ramp or loading position shown in FIG. 10D. Placing one or more of the central section 316, the passenger side section 320, and the driver side section 324, in the loading position can provide a ramp to help a user load cargo into the cargo bed 304.

Figure 11A:
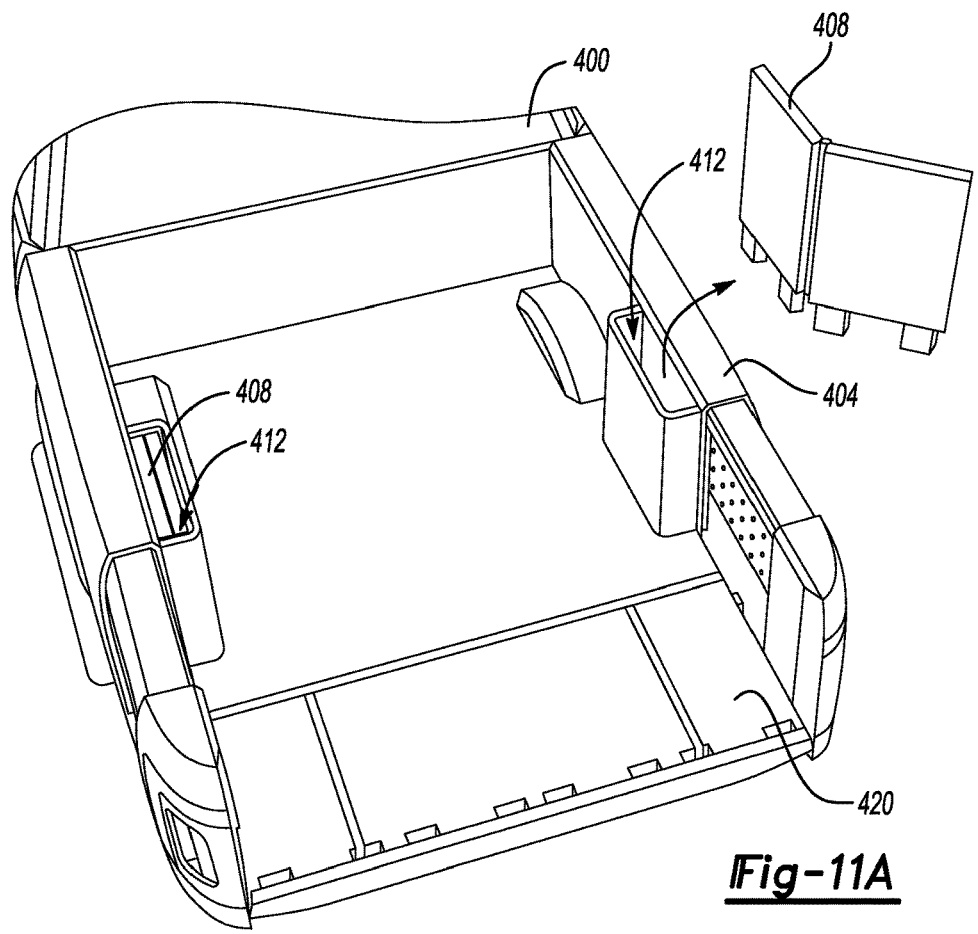
FIGS. 11A to 11C illustrate selected portions of a vehicle having stowable barriers that can be used as a load stop.
Figure 11B:
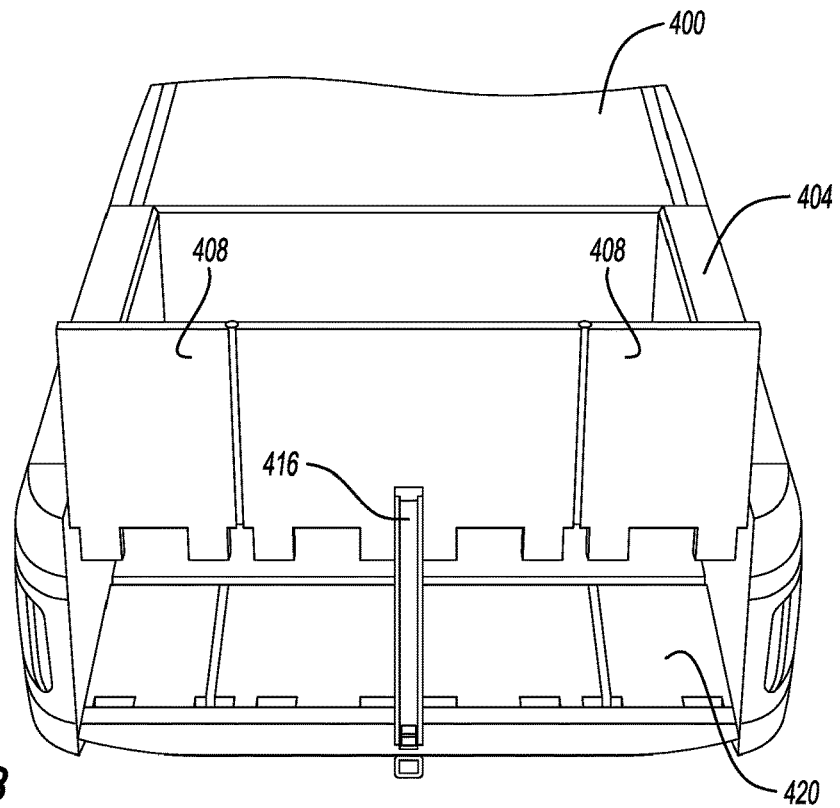
Figure 11C:
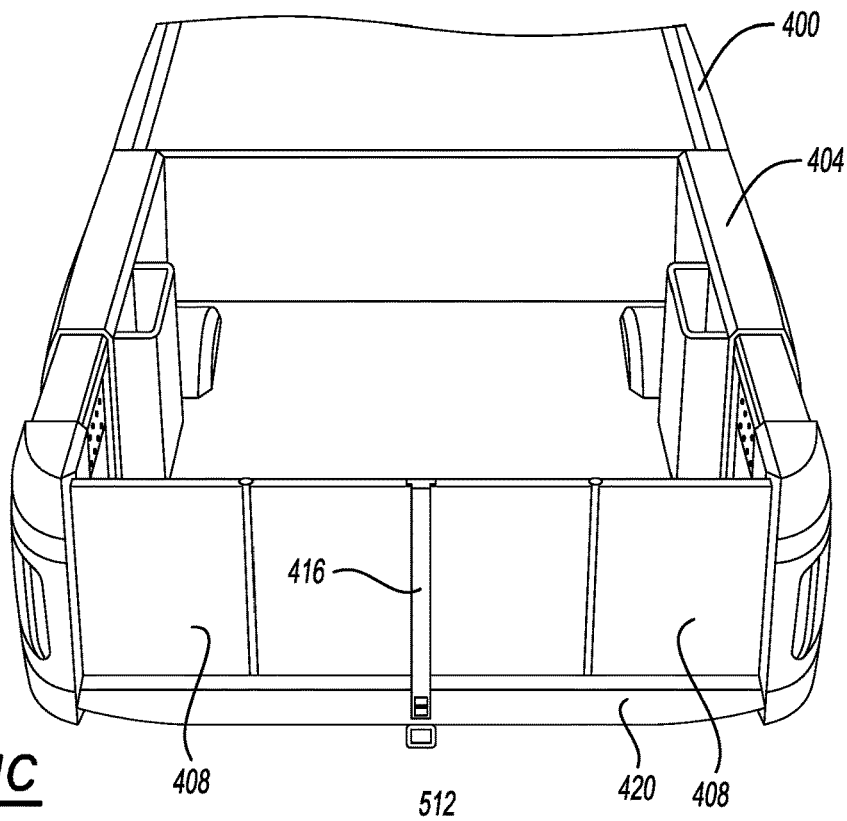

With reference now to FIGS. 11A-11C, a vehicle 400 having a cargo bed 404 includes one or more stowable barriers 408. In this example, when not in use, the stowable barriers 408 are stored within a pocket 412 in the cargo bed 404 as shown in FIG. 11A. The stowable barriers 408 are foldable in this example.

The stowable barriers 408 can be removed from the pockets 412, unfolded, and then secured to an aft end of the cargo bed 404 to provide a load stop as shown in FIGS. 11B and 11C. A support post 416 can extend from a position within a tailgate 420 of the vehicle 400 to help stabilize the stowable barriers 408 when providing the load stop. Instead of, or in addition to the pockets 412 within the cargo bed 404, the stowable barriers 408 could be stowed within a frunk of the vehicle 400, or within a passenger compartment of the vehicle 400.

With reference now to FIGS. 12A-12D, a vehicle 500 having a cargo bed 504 includes one or more pivotable barriers 508. In this example, a pivotable barrier 508 is coupled to each cargo bed sidewall 512 of the vehicle 500.

The cargo bed 504 is extendable in this example. When the cargo bed 504 is not in an extended position, the pivotable barriers 508 are held within the cargo bed sidewalls 512 of the vehicle 500. When the cargo bed 504 is transitioned to the extended position as shown, the pivotable barriers are withdrawn from within the sidewalls.

Figure 12A:
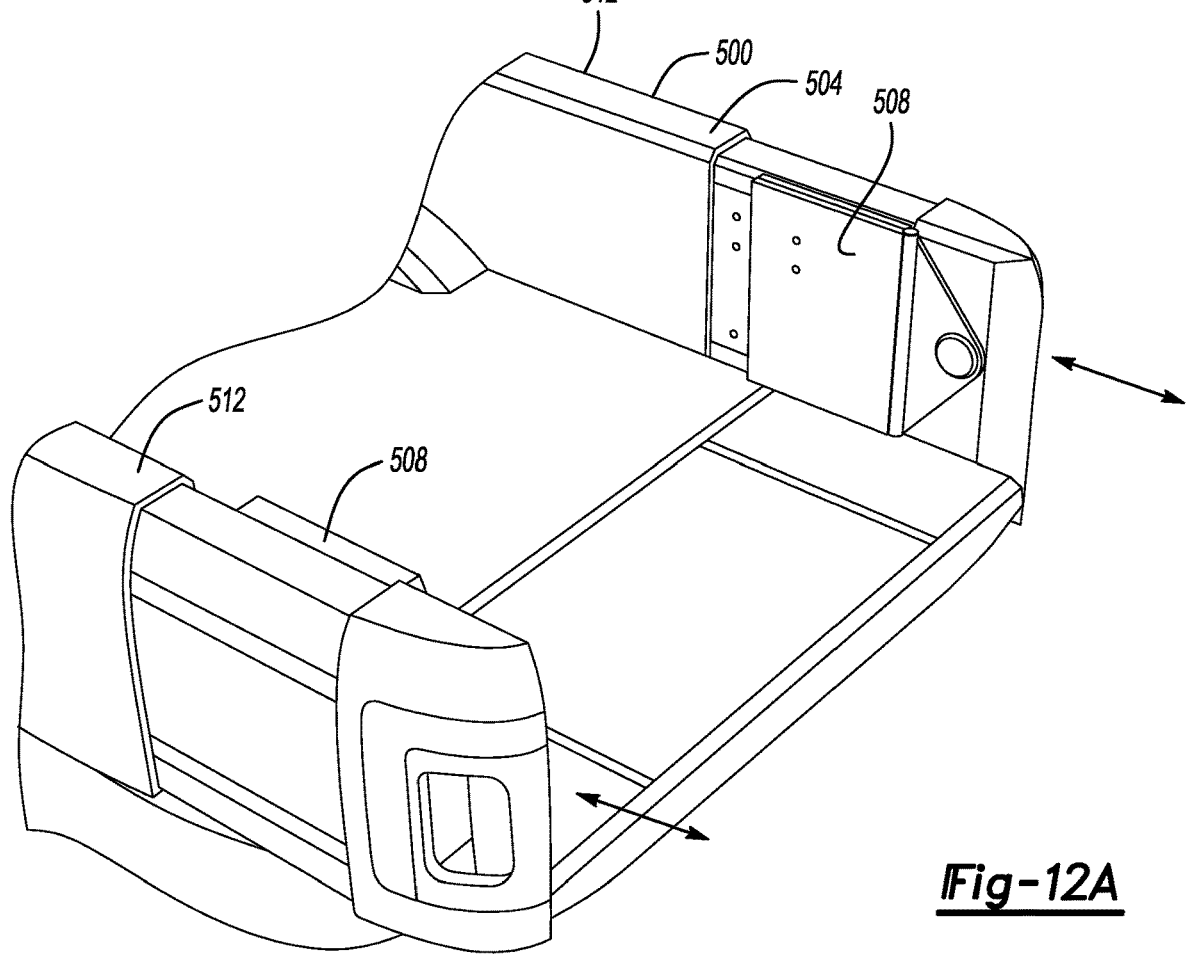
FIGS. 12A to 12D illustrate selected portions of a vehicle having a pivotable barriers that can be used as a load stop.
Figure 12B:
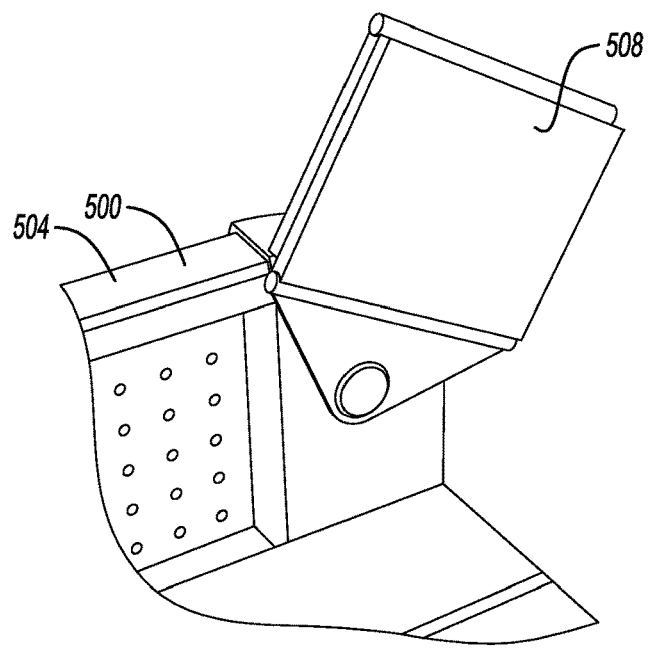
Figure 12C:
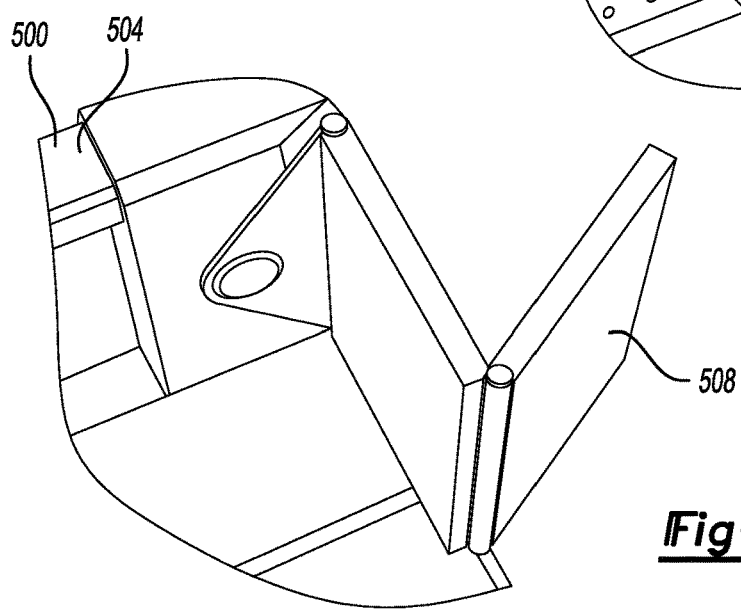
Figure 12D:
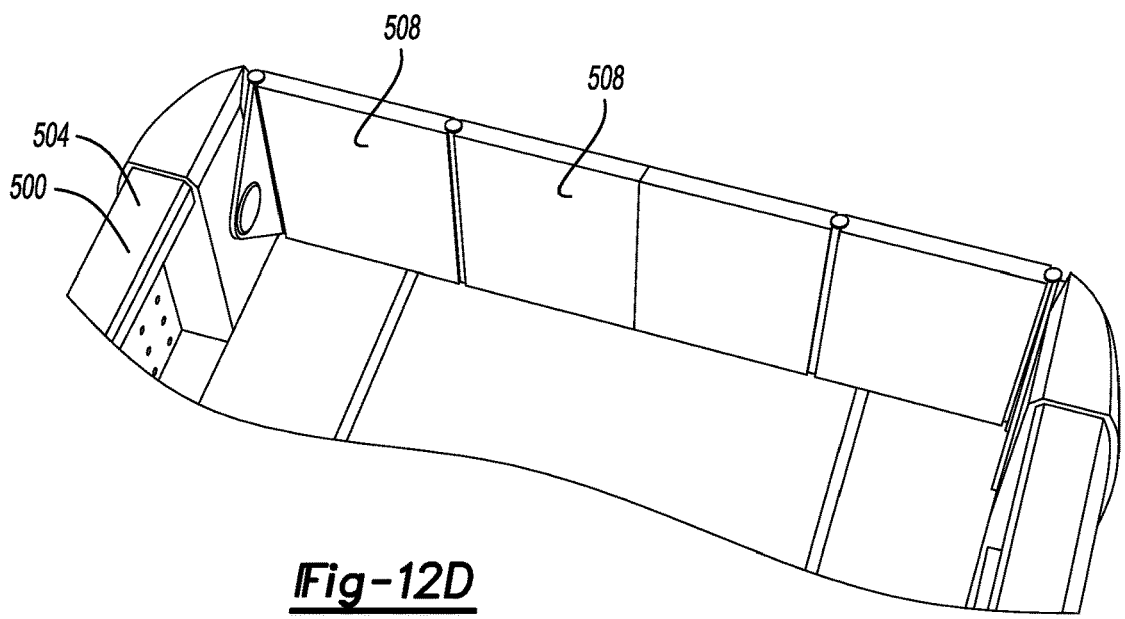

Once withdrawn, the pivotable barriers 508 can be pivoted and unfolded as shown in FIGS. 12B and 12C to provide a load stop at the aft end of the cargo bed 504 as shown in FIG. 12D.

Figure 13A:
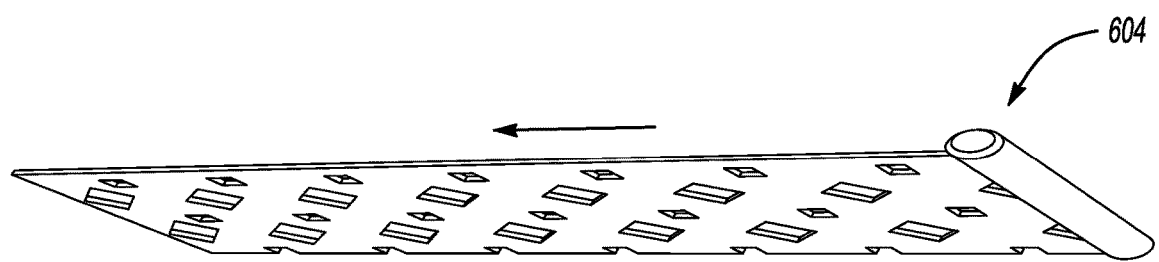
FIGS. 13A to 13D illustrate a roller load stop and selected portions of a vehicle having the roller load stop.
Figure 13B:
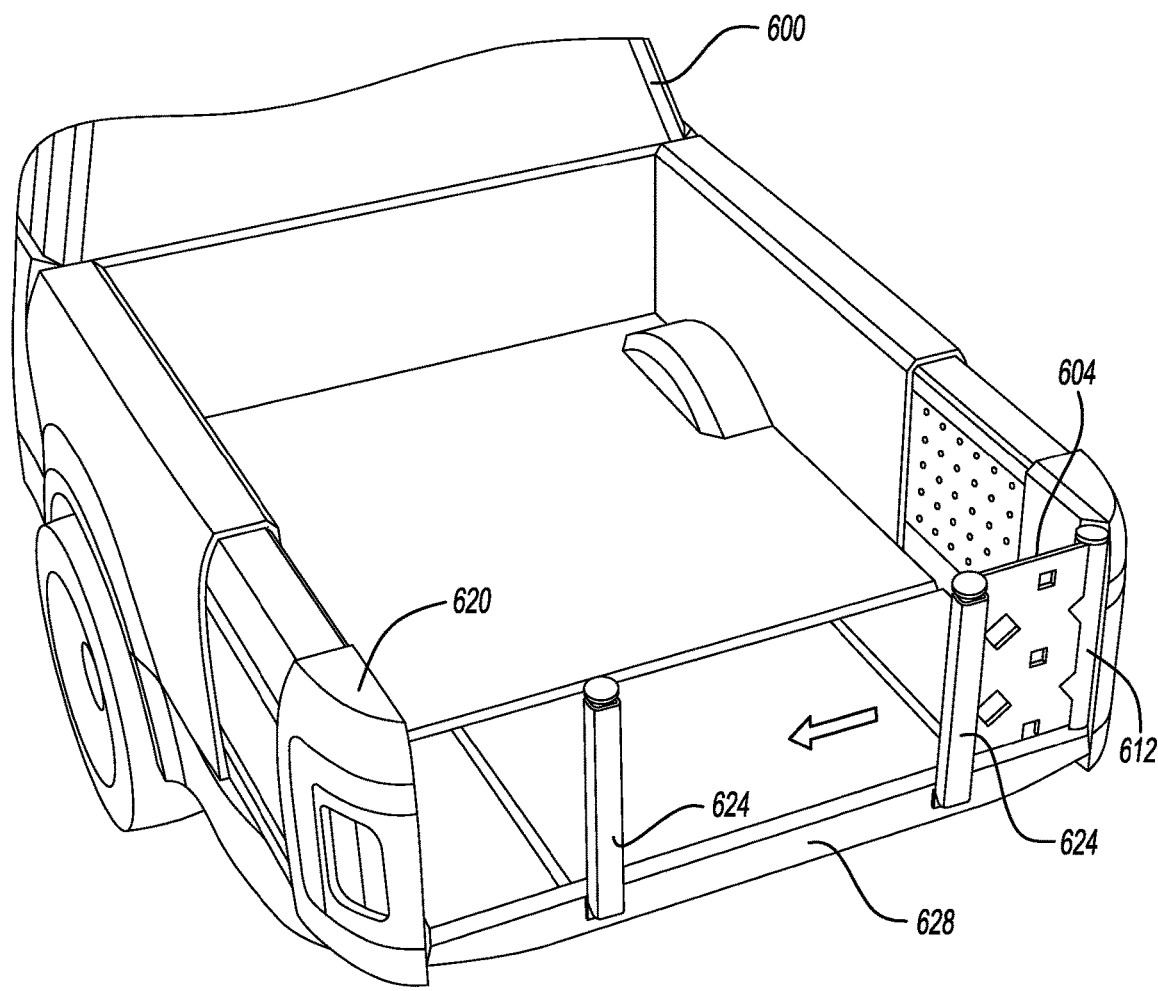
Figure 13C:
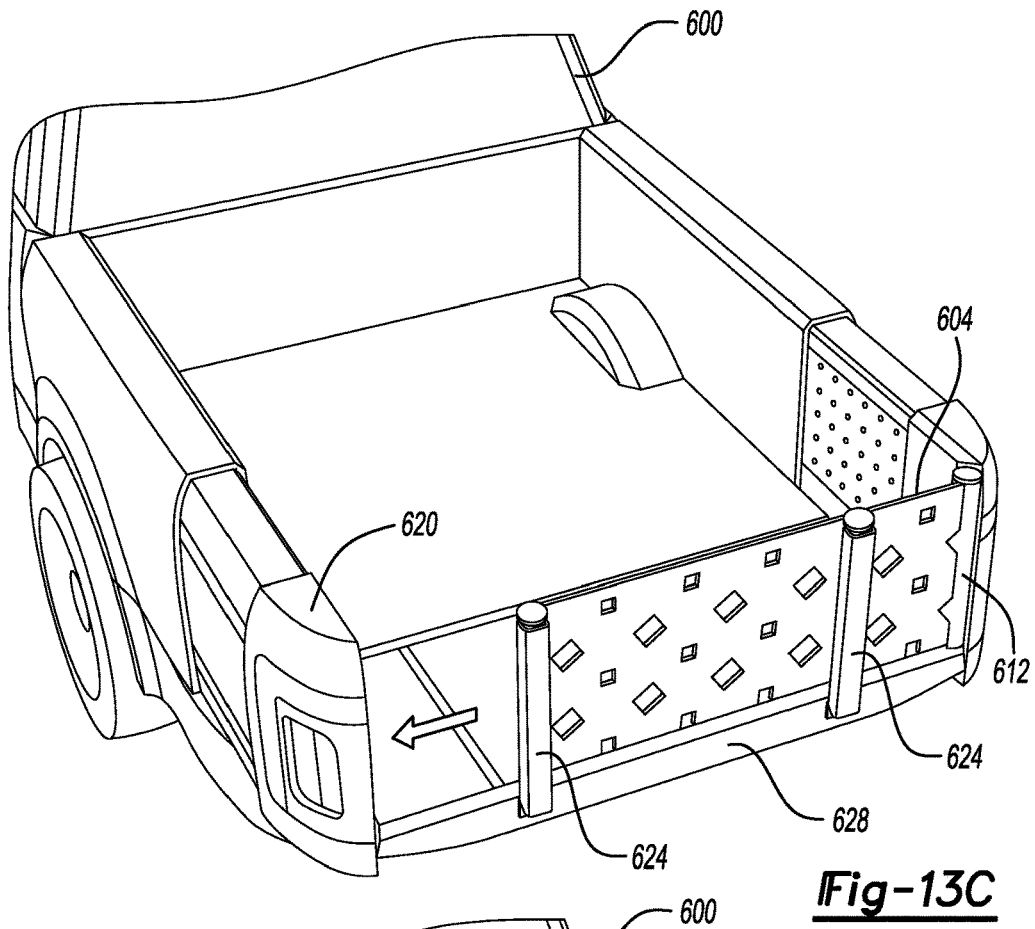
Figure 13D:
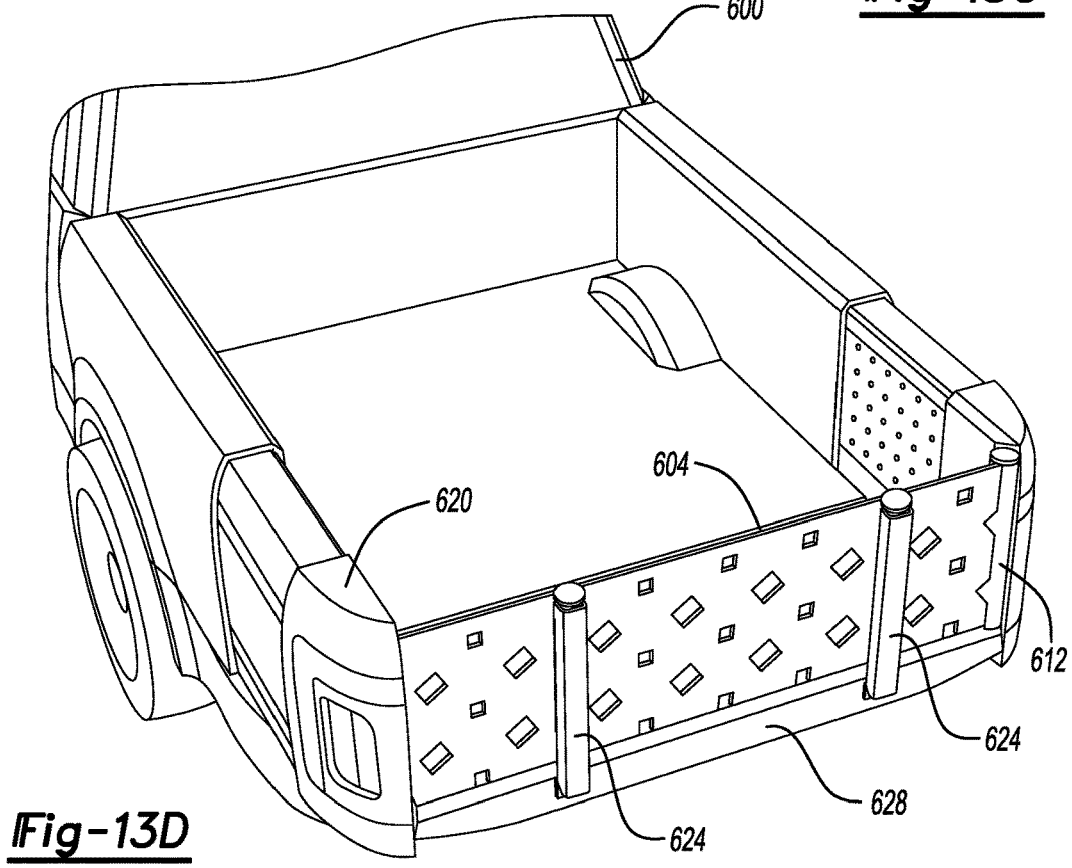

With reference now to FIGS. 13A-13D, an example vehicle 600 includes one or more roller load stops 604. The roller load stops 604 includes a barrier 608 that can be rolled about a shaft within a housing 612. The barrier 608 can be unrolled from the shaft, and the housing 612 secured to a tailgate 616 as shown in FIGS. 13B-13D. The barrier 608 can extend from the housing 612 to a sidewall 620 of the vehicle 600. The barrier 608 spans between the housing 612 and the sidewall 620 to provide a load stop. Support posts 624 can be coupled to the vehicle 600 to help support the barrier 608 when spanning between the housing 612 and the sidewall 620. The support posts 624 can be withdrawn from a stowed position within a tailgate 628 of the vehicle 600.

When the load stop is no longer required, the barrier 608 can be rerolled about the shaft and contained within the housing 612 for storing within the vehicle 600. In some examples, the barrier 608 can be screen printed with graphics, which may aesthetically enhance the appearance of the load stop when in the unrolled position. The roller load stops 604 can be removable to enable a quick swap of one roller load stop 604 with another. This can facilitate changing roller load stops 604 to change graphics, for example, to allow a user to customize a vehicle with a desired appearance.

Figure 14A:
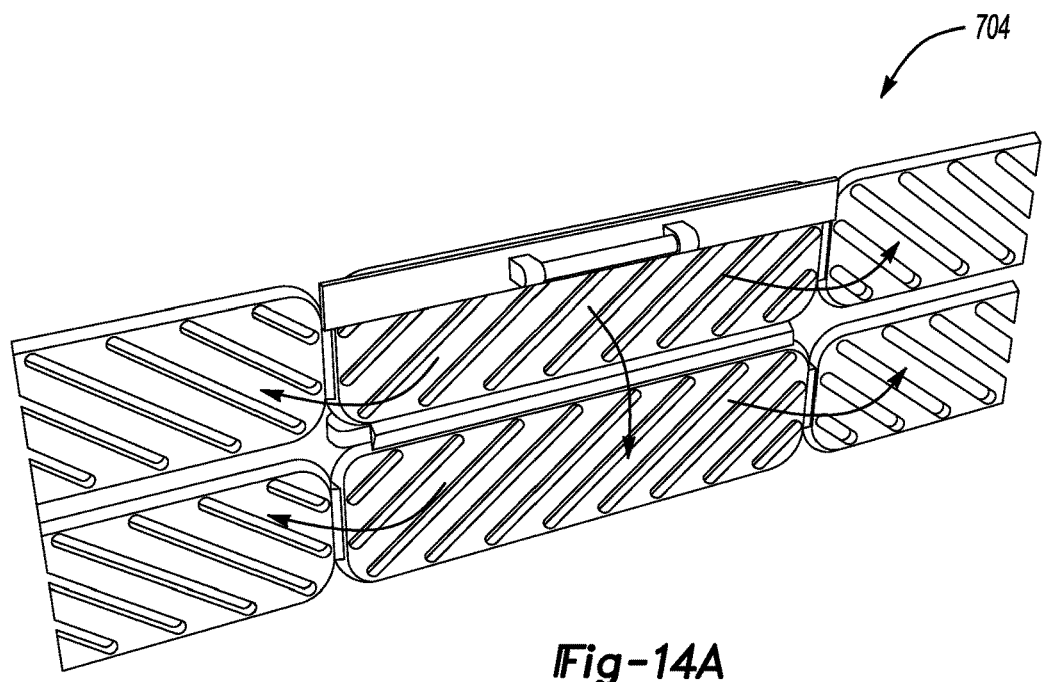
FIGS. 14A and 14B illustrate selected portions of a vehicle having a slide out step and load stop.
Figure 14B:
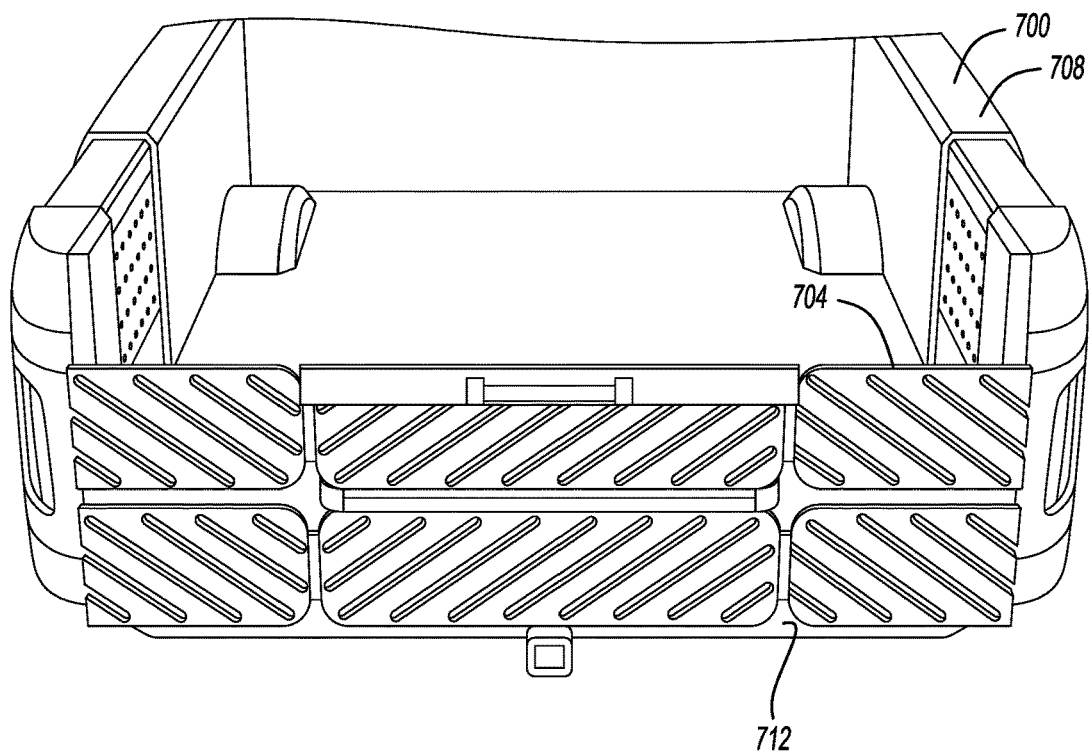

With reference now to FIGS. 14A and 14B, another example vehicle 700 includes a slide-out load stop 704 that can be unfolded to provide a load stop enclosing an aft end of a cargo bed 708. When folded, the slide-out load stop 704 can be stowed within a tailgate 712 of the vehicle 700, or elsewhere within the vehicle 700.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed system, comprising:
a stair assembly movable between a stowed position and a staircase position relative to a vehicle structure;
first and second support arm assemblies of the stair assembly, the first and second support arm assemblies each including a fixed rail and a linkage assembly, the linkage assembly having inner bars slidably engaged with outer bars; and
first and second steps of the stair assembly, the first and second steps pivotably coupled together by the linkage assembly such that the first and second steps are configured to pivot together.

2. The system of claim 1, wherein, when moved from the stowed position to the staircase position, the stair assembly is configured to translate horizontally from the stowed position to an extended position where the stair assembly is extended relative to the vehicle structure, and then pivot relative to the vehicle structure from the extended position to the staircase position, the outer bars extended relative to the inner bars when the stair assembly is in the extended position and when the stair assembly is in the staircase position.

3. The system of claim 2, wherein the first step and the second steps pivot together relative to the first and second support arm assemblies when the stair assembly pivots relative to the vehicle structure from the extended position to the staircase position.

4. The system of claim 1, wherein the first and second steps are pivotably coupled together by the outer bars of the linkage assembly.

5. The system of claim 1, wherein the outer bars of the linkage assemblies establish a four-bar linkage that pivotably couples together the first and second steps.

6. The system of claim 1, wherein the linkage assemblies telescope relative to respective fixed rails of the support arm assemblies when the stair assembly is transitioned from the stowed position to an extended position, wherein the outer bars telescope relative to the respective inner bars when the stair assembly is transitioned from the stowed position to the extended position, wherein the linkage assemblies pivots relative to the respective fixed rails when the stair assembly is pivoted from the extended position to the staircase position.

7. The system of claim 1, wherein the vehicle structure is a tailgate of a vehicle.

8. The system of claim 7, wherein the stair assembly extends rearward relative to an orientation of the vehicle when moving from the stowed position within the tailgate.

9. The system of claim 7, wherein the stair assembly moves laterally outward relative to an orientation of the vehicle when moving from the stowed position within the tailgate.

10. The system of claim 1, wherein the first and second steps each include a stepping surface, the first and second steps pivoting to keep the respective stepping surfaces facing vertically upward when the stair assembly is transitioned between the stowed position and the stepping position.

11. The system of claim 1, wherein the first step is spaced vertically from the second step when the stepping assembly is in the staircase position.

12. The system of claim 1, further comprising at least one lift assist that damps movement of the stair assembly from an extended position to the staircase position, assists movement of the stair assembly from the staircase position to an extended position, or both.

13. A method of transitioning a stair assembly of a vehicle, comprising:
- extending a stair assembly from a stowed position within a vehicle structure to an extended position relative to the vehicle structure;
- during the extending, sliding linkage assemblies relative to respective fixed rails, and sliding inner bars of the linkage assemblies relative to respective outer bars of the linkage assemblies;
- lowering the stair assembly from the extended position to a staircase position by pivoting the linkage assemblies relative to the vehicle structure; and
- during the lowering, rotating the linkage assemblies relative to at least one step of the stair assembly.

14. The method of claim 13, wherein the at least one step includes an upper step and a lower step.

15. The method of claim 14, wherein the upper step and the lower step are rotatably coupled together by the linkage assemblies.

16. The method of claim 13, wherein the vehicle structure is a vehicle tailgate.

17. A cargo bed system, comprising:
- a stair assembly movable between a stowed position and a staircase position relative to a vehicle structure;
- a pair of support arm assemblies of the stair assembly, the support arm assemblies each including a fixed rail, a first bar, and a second bar, the first bar and the second bar configured to be slidably received within the fixed rail when the stair assembly is in the stowed position, the first bar telescopically extended relative to the second bar when the stair assembly is in the staircase position; and
- first and a second steps of the stair assembly the first and second steps supported by the pair of support arm assemblies.

18. The cargo bed system of claim 17, wherein the first bars of the pair of support arm assemblies pivotably coupled together the first and second steps such that the first and second steps are configured to pivot together.

19. The cargo bed system of claim 17, wherein the first bars of the pair of support arm assemblies are outer bars, wherein the second bars of the pair of support arm assemblies are inner bars.

20. The cargo bed system of claim 17, wherein the vehicle structure is a tailgate, wherein the stair assembly extends rearward relative to an orientation of the vehicle when moving from the stowed position within the tailgate.

* * * * *